United States Patent [19]

Usami et al.

[11] Patent Number: 5,781,709
[45] Date of Patent: Jul. 14, 1998

[54] METHOD OF AND APPARATUS FOR GENERATING PROOF

[75] Inventors: Yoshinori Usami; Akito Ohkubo; Yoshifumi Dounomae, all of Ashigarakami-gun, Japan

[73] Assignee: Fuji Photo Film Co., Ltd., Kanagawa, Japan

[21] Appl. No.: 734,018

[22] Filed: Oct. 18, 1996

[30] Foreign Application Priority Data

Oct. 20, 1995 [JP] Japan ................... 7-273297

[51] Int. Cl.⁶ ................ G06F 15/00; H04N 1/23; H04N 1/46; G03F 3/08
[52] U.S. Cl. ................ 395/109; 395/111; 358/296; 358/500; 358/518; 358/527; 358/530; 358/534
[58] Field of Search ................ 358/296, 500, 358/503, 502, 504, 518, 527, 530, 536, 537, 534; 395/109, 111

[56] References Cited

U.S. PATENT DOCUMENTS

5,019,472  5/1991  Benack et al. ............ 356/404

*Primary Examiner*—Edward L. Coles
*Assistant Examiner*—Mark Wallerson
*Attorney, Agent, or Firm*—Sughrue, Mion, Zinn, Macpeak & Seas, PLLC

[57] ABSTRACT

A color proof is generated as a hard copy approximating a printed color document by a color printer or as a displayed image approximating a printed color document by a color display monitor. A color shift produced by a filtering process which cuts off a spatial frequency response inherent in an image output device such as a color printer, a color display monitor, or the like while retaining a spatial frequency response inherent in a printing screen of a printed color document during an image structure simulation process is corrected by a color shift correcting LUT, and thereafter a color shift caused when a color digital printer is used is corrected by a color shift correcting LUT. A generated color proof accurately reproduces colors and image structure of the printed color document.

18 Claims, 10 Drawing Sheets

| $d_{11}$ ($d_{ij}$) | | | | AF | | | | |
|---|---|---|---|---|---|---|---|---|
| 4 | 10 | 16 | 20 | 22 | 20 | 16 | 10 | 4 |
| 10 | 25 | 40 | 50 | 55 | 50 | 40 | 25 | 10 |
| 16 | 40 | 64 | 80 | 88 | 80 | 64 | 40 | 16 |
| 20 | 50 | 80 | 100 | 110 | 100 | 80 | 50 | 20 |
| 22 | 55 | 88 | 110 | 121 | 110 | 88 | 55 | 22 |
| 20 | 50 | 80 | 100 | 110 | 100 | 80 | 50 | 20 |
| 16 | 40 | 64 | 80 | 88 | 80 | 64 | 40 | 16 |
| 10 | 25 | 40 | 50 | 55 | 50 | 40 | 25 | 10 |
| 4 | 10 | 16 | 20 | 22 | 20 | 16 | 10 | 4 |

METHOD OF AND APPARATUS FOR GENERATING PROOF

BACKGROUND OF THE INVENTION

1. Field of the Invention

The present invention relates to a method of and an apparatus for producing a color proof with either a color printer which forms pixel images on a sheet according to a density gradation process or a color display monitor which forms pixel images on a display panel according to a luminance modulation process, before a printed color document of a half-tone dot image is produced by a color printing machine having rotary presses or the like. A color proof generated on a sheet may be referred to as a "hard proof", and a color proof displayed as an image on a color display monitor may be referred to as a "soft proof".

2. Description of the Related Art

It has heretofore been customary to produce a color proof for examining and correcting colors before a printed color document of a halftone dot image is produced by a color printing press.

Color printers are used to produce color proofs because the color printers are relatively simple in structure and inexpensive to manufacture and can produce hard copies with images formed on sheets a plurality of times in a short period of time since, as well known in the art, they do not need the production of process-plate films and presensitized plates which are required by color printing machines.

Figure 10:
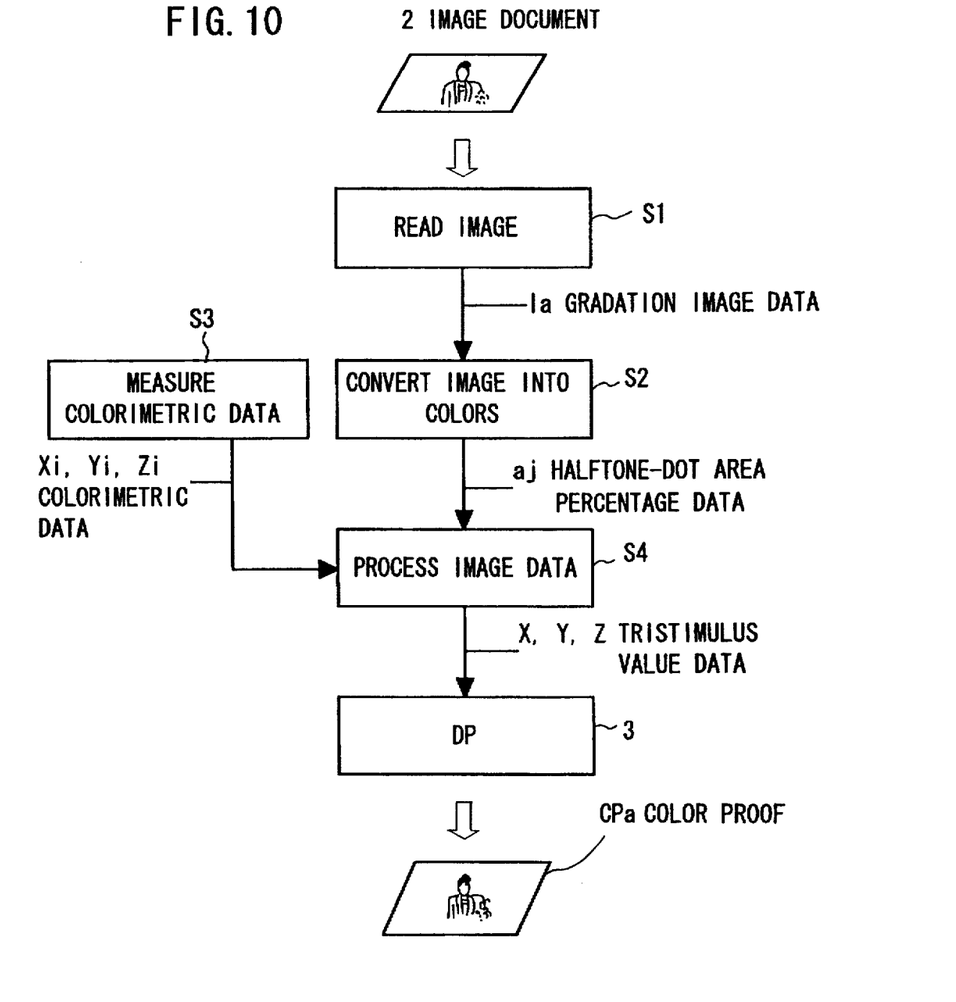
FIG. 10 is a flowchart of a conventional process of producing a color proof.

FIG. 10 of the accompanying drawings shows the sequence of a conventional process of producing a color proof.

According to the conventional process of producing a color proof, as shown in FIG. 10, an image on an image document 2 is read by an image reader such as a color scanner having a CCD area sensor or linear sensor or the like, and gradation image data Ia of each of the colors R (red), G (green), and B (blue) are generated from the read image in a step S1.

Then, the RGB gradation image data Ia are converted by a color conversion process into halftone-dot area percentage data aj of the four plates of respective colors C (cyan), M (magenta), Y (yellow), and K (black), where j=0~3 (0 represents the color C, 1 the color M, 2 the color Y, and 3 the color K) in a step S2. The color conversion process has various versions corresponding to different color printing machines, and those versions are based on know-hows of various printing companies depending on their color printing machines.

Images on printed color documents produced by the color printing machines are halftone-dot images. To produce a printed color document actually, halftone-dot area percentage data aj produced by a color conversion process are developed into bit map data, and a process-plate film or the like is generated based on the bit map data. Because an automatic image developing machine is required, a process following the generation of the process-plate film is considerably complex.

In order to facilitate the production of a color proof CPa, a digital color printer (DP) 3 is employed. The DP 3 forms an image on a donor film by digitally controlling the intensity and time of three-primary emission of LED (light-emitting diode) light or a laser beam per pixel, and transfers the image from the donor film to an image-receiving sheet to form the image thereon. The DP 3 is much more inexpensive than a color printing machine which generates presensitized plates from printing plates and produces a printed color document with the presensitized plates. The DP 3 is also smaller in volume and lighter in weight.

In order to employ the DP 3, it is necessary to convert the halftone-dot area percentage data aj of the four plates C, M, Y, K produced in the step S2 into image data (called "common color space data") independent of devices including a printing device, a CRT, a photographic device, an LET, etc., e.g., tristimulus value data X, Y, Z.

Therefore, the halftone-dot area percentage data aj of the four plates C, M, Y, K are converted into tristimulus value data X, Y, Z by a image data processing in a step S4. The image data processing has heretofore been carried out by a process which uses the Neugebauer's equation.

Prior to the step S4, colorimetric data $Xi$, $Yi$, $Zi$ (i represents $2^4$=16 colors for the four plates C, M, Y, K, i=0~15) for the colors of printing inks are measured by a colorimeter in a step S3. For measuring the colorimetric data $Xi$, $Yi$, $Zi$, the 16 colors are printed on a print sheet which will be used to produce a printed color document by a color printing machine. The 16 colors correspond to the presence and absence of the respective colors C, M, Y, K, which represent a combination of $2^4$=16 colors.

Specifically, the 16 colors include the color W (white) which is present when nothing is printed on the print sheet, the primary colors C, M, Y, the color K (black), and the mixed colors C+M, C+Y, C+K, M+Y, M+K, Y+K, C+M+Y, C+M+K, C+Y+K, M+Y+K, and C+M+Y+K. The colors of reflections from the colors printed on the print sheet are measured by a colorimeter such as a spectrometer, for example, thereby producing the colorimetric data $Xi$, $Yi$, $Zi$.

According to the process which uses the Neugebauer's equation, the colorimetric data $Xi$, $Yi$, $Zi$ are multiplied by a coefficient of halftone-dot area percentage data hi (i=0~15), as shown below, thus producing the tristimulus value data X, Y, Z in the step S4.

$$X = \Sigma hi \cdot Xi, \quad (1)$$
$$Y = \Sigma hi \cdot Yi, \text{ and}$$
$$Z = \Sigma hi \cdot Zi$$

where i=0~15, $$h0 = (1-c) \cdot (1-m) \cdot (1-y) \cdot (1-k),$$
$$h1 = c \cdot (1-m) \cdot (1-y) \cdot (1-k),$$
$$h2 = (1-c) \cdot m \cdot (1-y) \cdot (1-k),$$
$$h3 = c \cdot m \cdot (1-y) \cdot (1-k),$$
$$h4 = (1-c) \cdot (1-m) \cdot y \cdot (1-k),$$
$$h5 = c \cdot (1-m) \cdot y \cdot (1-k),$$
$$h6 = (1-c) \cdot m \cdot y \cdot (1-k),$$
$$h7 = c \cdot m \cdot y \cdot (1-k),$$
$$h8 = (1-c) \cdot (1-m) \cdot (1-y) \cdot k,$$
$$h9 = c \cdot (1-m) \cdot (1-y) \cdot k,$$
$$h10 = (1-c) \cdot m \cdot (1-y) \cdot k,$$
$$h11 = c \cdot m \cdot (1-y) \cdot k,$$
$$h12 = (1-c) \cdot (1-m) \cdot y \cdot k,$$
$$h13 = c \cdot (1-m) \cdot y \cdot k,$$
$$h14 = (1-c) \cdot m \cdot y \cdot k, \text{ and}$$
$$h15 = c \cdot m \cdot y \cdot k$$

where c, m, y, k represent halftone-dot area percentage data aj of the colors C, M, Y, K.

The tristimulus value data X, Y, Z thus generated are supplied to the DP 3. The DP 3 converts the tristimulus value data X, Y, Z into data of the three primaries with respect to the LED or the like, i.e., image data depending on the devices, which may also be called inherent color space data, based on a look-up table (LUT), and thereafter generates the color proof CPa, which is a hard copy with an image formed on a sheet, based on the image data.

In the case where the tristimulus value data X, Y, Z for the DP 3 are generated according to the Neugebauer's equation, the colors of a printed color document to be produced can accurately be reproduced in the image on the hard copy because the colorimetric data measured by a colorimeter as representing the colors of an image to be formed on the printed color document by the color printing machine are employed. However, interference fringes such as moiré, a rosette image, or the like (hereinafter referred to as a "false pattern") which appears on a printed color document, or stated otherwise an interference irregularity caused by a periodic structure of halftone dots peculiar to printed documents, cannot be reproduced in the image on the hard copy.

If such a false pattern actually appears on a printed color document, then it should also accurately be reproduced on a color proof CPa. Generally speaking, the conventional color proof CPa which fails to reproduce a false pattern thereon cannot be said as an accurate proof for a printed color document.

It is believed that no false pattern can be reproduced on a hard copy produced by the DP 3 because the Neugebauer's equation is a kind of theory of probability and is unable to reproduce a microscopic image structure (halftone structure) of a false pattern.

For reproducing an image structure, it is necessary for an image output device which outputs a hard copy to have a mechanism for producing the same image structure (threshold matrix, bit map data, or the like) as that of a printed document which is to be approximated. It is difficult and substantially expensive for such a mechanism to cope with all of various printing conditions.

U.S. patent application Ser. No. 08/362,899, for example, discloses a process for reproducing image structures with a simple device such as a color printer or the like.

According to the disclosed process, after tristimulus value data X, Y, Z have been generated using the Neugebauer's equation, a periodic noise signal which is a pseudo-signal relative to an image structure such as moiré, a rosette image, or the like is added to the tristimulus value data X, Y, Z for thereby reproducing the colors and the image structure on a hard copy with a color printer. The disclosed process is capable of accurately reproducing colors and an image structure on a color proof.

SUMMARY OF THE INVENTION

It is therefore an object of the present invention to provide a method of and an apparatus for producing a color proof, which allow an image output device such as a color printer or the like that is relatively inexpensive and has a relatively low resolution to accurately reproduce interference fringes such as moiré or the like which appear on a high-resolution printed color document, thereby permitting a finally printed color document to be properly corrected for colors.

The above and other objects, features, and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

A method of and an apparatus for producing a color proof according to the present invention will be described below with reference to the accompanying drawings. Those parts or steps shown in FIGS. 1 through 9 which are identical to those shown in FIG. 10 are denoted by identical reference characters, and will not be described in detail below.

Figure 1:
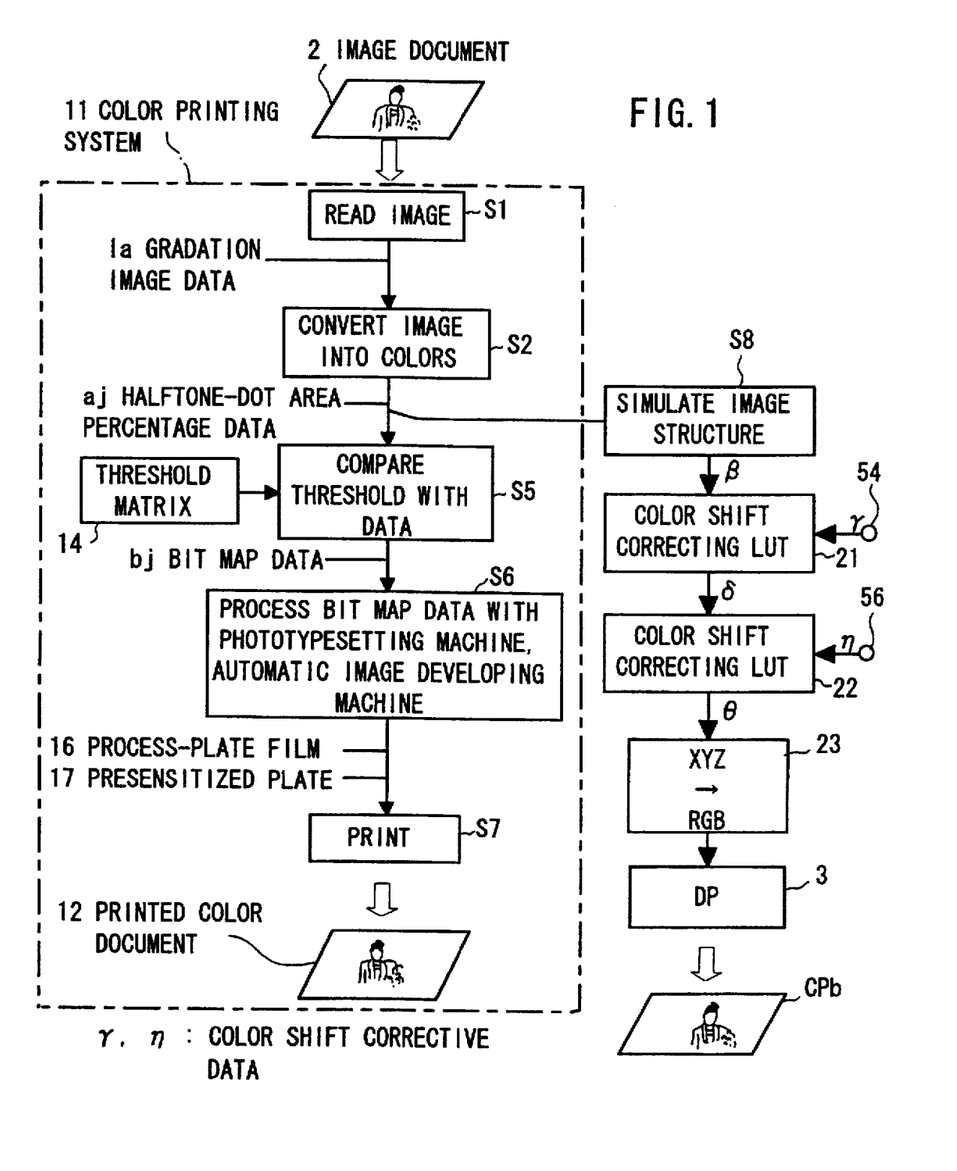
FIG. 1 is a flowchart of a process of producing a color proof with respect to a printed color document, the process including a processing sequence according to an embodiment of the present invention.

FIG. 1 shows a process of producing a color proof CPb with a color digital printer (DP) 3 according to an embodiment of the present invention, with respect to a printed color document 12 which is produced by a general color printing system 11.

The general color printing system 11 will first be described below.

In the general color printing system 11, an image on an image document 2 is read by an image reader such as a color scanner having a CCD area sensor or linear sensor or the like, and gradation image data Ia of each of the colors R (red), G (green), and B (blue) are generated from the read image in a step S1. The CCD area sensor or linear sensor or the like has a resolution which may be selected to be of 400 DPI (Dots Per Inch), for example. One dot corresponds to one pixel according to a density gradation process (continuous tone process) with 256 gradations or the like.

The pixel data of the gradation image data Ia of RGB are then converted by a color conversion process into halftone-dot area percentage data aj of the four plates of respective colors C (cyan), M (magenta), Y (yellow), and K (black) in a step S2. The color conversion process has various versions depending on different color printing machines, as described later on, and those versions are based on know-hows of various printing companies depending on their color printing machines. If no UCR (Under-Color Removal) process is carried out, then the gradation image data Ia of RGB may be converted into halftone-dot area percentage data aj of the three plates of colors C, M, Y. If the color Y is not present on the printed color document 12, then the gradation image data Ia of RGB may be converted into halftone-dot area percentage data aj of the two plates of colors C, M.

Four threshold matrixes (also called "threshold templates") 14 having a resolution of about 2000 DPI (in the illustrated embodiment, a resolution of 1600 DPI for an easier understanding) and a desired screen angle and screen ruling with respect to each of the four plates C, M, Y, K are referred to for comparing each threshold of each element of the threshold matrixes 14 with the values of the halftone-dot area percentage data aj, thereby converting the values of the halftone-dot area percentage data aj into binary data having a value of "0" or "1", i.e., bit map data bj, in a step S5. The screen angles of the threshold matrix 14 for the plate Y and the threshold matrix 14 for the plate M, for example, have an angle difference of 45° or the like. Actually, the screen angles of the threshold matrix 14 for the four plates C, M, K have angle differences of 75°, 45°, 15°, respectively, with respect to a reference (0°) which is provided by the plate Y. The screen ruling is 175 in this embodiment.

Figure 2:
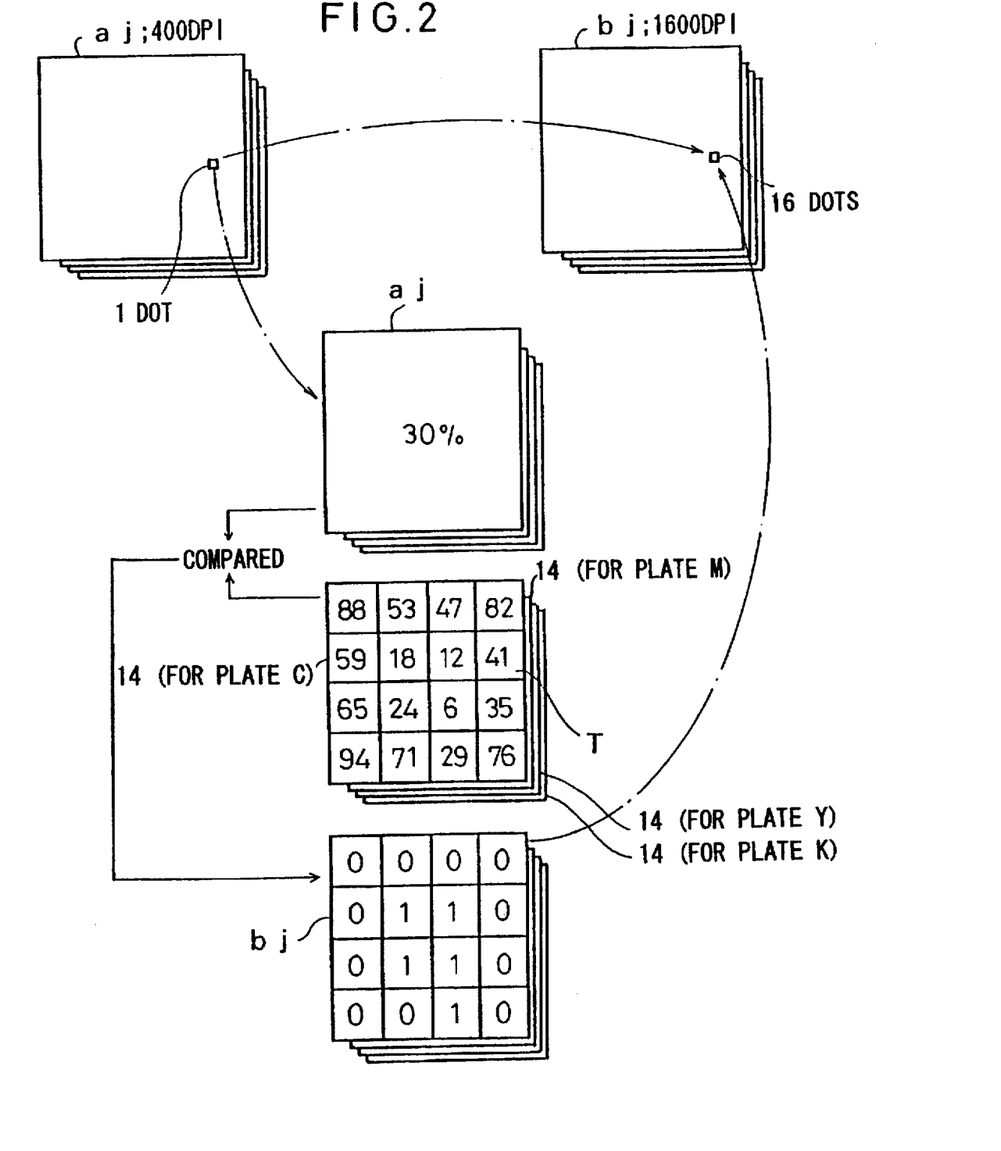
FIG. 2 is a diagram illustrative of the generation of general bit map data for producing a printed color document, in the process shown in FIG. 1.

FIG. 2 schematically shows the threshold matrixes 14, etc. for illustrating the generation of bit map data in the step S5.

In FIG. 2, a process shown between two uppermost blocks illustrates a conversion from one dot of halftone-dot area percentage data aj of 400 DPI into 16 dots of bit map data bj of 1600 DPI.

If one dot of halftone-dot area percentage data aj belongs to the plate C, for example, and the value of the halftone-dot area percentage data aj is represented aj=30% (75 in the gradations 0~255), then it is compared with the threshold matrix 14 for the plate C. The threshold matrix 14 is composed of thresholds T (the thresholds shown in FIG. 2 are expressed by %) arranged in a convolutional pattern in the matrix elements. In this embodiment, the thresholds T represent 0~100% assigned by quantizing numbers (0~255 for 8-bit gradations) and arranged in a convolutional pattern.

As is well known in the art, the generation of bit map data bj, i.e., the conversion of the values of the halftone-dot area percentage data aj into binary data, is carried out according to the following formulas (2), (3):

$$aj > T \to 1 \quad (2)$$

$$aj \leq T \to 0 \quad (3)$$

In this manner, the bit map data bj corresponding to the pixel of the plate C, i.e., the pixel whose halftone-dot area percentage data aj is aj=30%), shown in a lowermost block in FIG. 2, are generated. As described above, the threshold matrixes 14 for the plates M, C, K have respective screen angles selectable with respect to the threshold matrix 14 for the plate Y. In this embodiment, the threshold matrixes 14 are in the form of a screen of irrational numbers. However, the threshold matrixes 14 are in the form of a screen of rational numbers.

The bit map data bj are then processed by a phototype-setting machine, an automatic image developing machine, etc. in a step S6 (FIG. 1), producing four process-plate films 16 having halftone dot images as block copies and presensitized plates 17 as printing plates.

Finally, using the presensitized plates 17, a printed color document 12 composed of a halftone dot image is produced by a color printing machine having rotary presses according to a printing process in a step S7.

The halftone dot image on the printed color document 12 contains interference fringes, known as a so-called image structure, such as moiré, a rosette image, or the like which does not appear on the image document 2 and which is caused by the threshold matrixes 14 having different screen angles.

According to the present invention, the colors and image structure that the printed color document 12 produced by the general color printing system 11 has is accurately reproduced on the color proof CPb.

The image structure of the printed color document 12 can accurately be reproduced when an image structure simulation process (described in detail later on) is carried out in a step S8. Since a color shift occurs when the image structure is reproduced, a color shift correcting look-up table (LUT) 21 is required to correct such a color shift. A color shift correcting LUT 22 is also required to correct a color shift which is produced because a color reproduction range of the DP 3 and a color reproduction range of the color printing machine differ from each other.

The color shift correcting look-up tables 21, 22 may be combined into a single look-up table, or may be replaced with corrective functions which approximate the color shift correcting look-up tables 21, 22.

Data corrected by the color shift correcting LUTs 21, 22 are common color space data described above. The common color space data are converted into color space data inherent in the DP 3 by a LUT 23 in FIG. 1, and thereafter are supplied to the DP 3, which can then generate the color proof CPb capable of accurately reproducing the image structure and colors. The LUT 23 may be incorporated in the DP 3.

Generation of the color shift correcting LUTs 21, 22 will now be described below.

Figure 3:
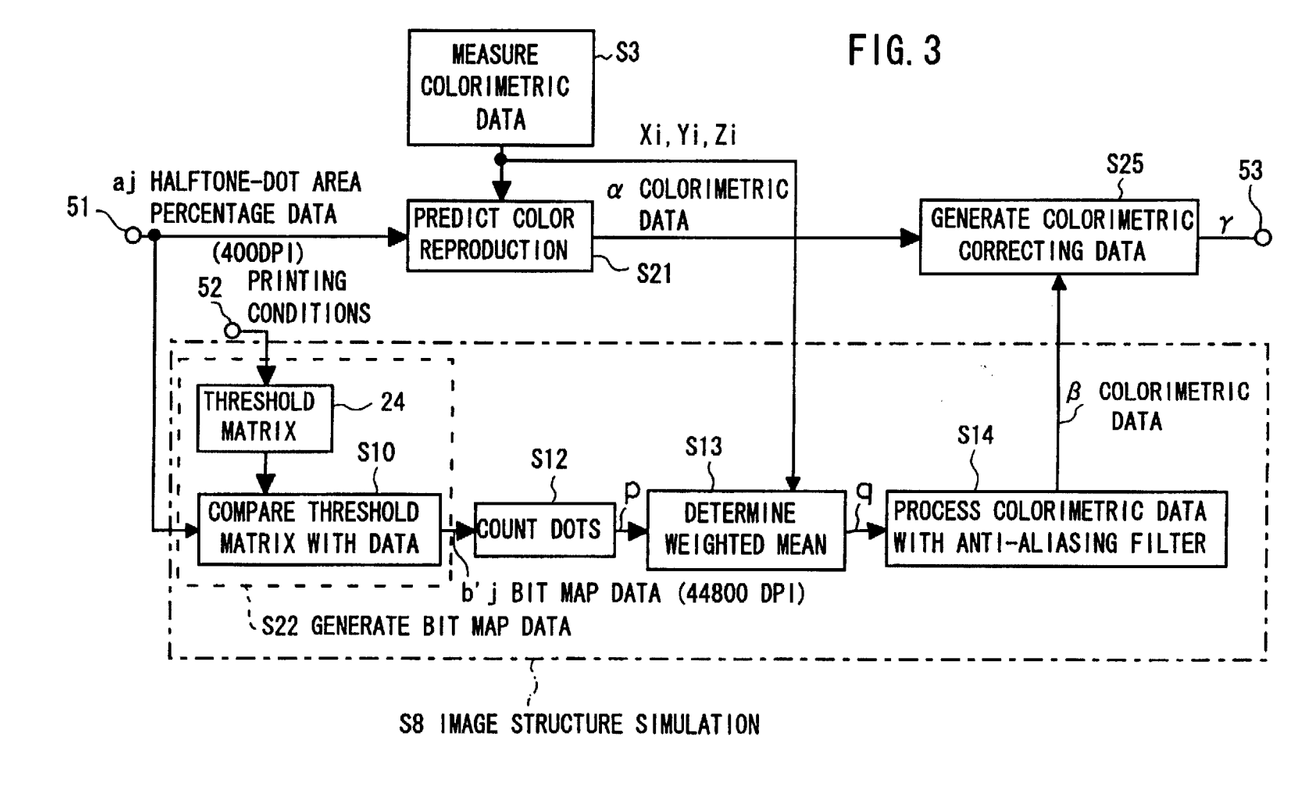
FIG. 3 is a block diagram of an arrangement for generating color shift corrective data for correcting a color shift produced by an image structure simulation.

FIG. 3 shows an arrangement for generating the color shift correcting LUT 2 for correcting a color shift produced by the image structure simulation process in the step S8.

For generating the color shift correcting LUT 21, a color reproduction predicting process in a step S21 and the image structure simulation process in the step S8 are first carried out.

The color reproduction predicting process in the step S21 may be the process using the Neugebauer's equation, as described above, or a process in which when the halftone-dot area percentage data aj of each of the four plates C, M, Y, K are varied by a given value (%), a plurality of color samples printed on the printed color document 12 are measured by a colorimeter, and colorimetric data in a CIE colorimetric system of each of the color samples, e.g., colorimetric data Xi, Yi, Zi which are tristimulus value data, are determined by an interpolation process, after which a look-up table or corrective function composed of the colorimetric values measured by the colorimeter and the colorimetric data determined by the interpolation process, which are addressable by the halftone-dot area percentage data aj as input data, is produced. In either of these processes, it is necessary at least to measure the colorimetric data Xi, Yi, Zi (i represents $2^4$=16 colors for the four plates C, M, Y, K) for each color with a colorimeter (see the step S3 in FIG. 10).

In the color reproduction predicting process in the step S21 (first processing means), colorimetric data (first colorimetric data) α are obtained using the colorimetric data Xi, Yi, Zi with respect to the halftone-dot area percentage data aj having a resolution of 400 DPI which are supplied from an input terminal 51 (see FIG. 3).

In the image structure simulation process in the step S8 (second processing means), bit map data peculiar to the image structure simulation process are generated in a step S22.

Specifically, threshold matrixes 24 are selected depending on the screen ruling and screen angles which are the same as those of printing conditions supplied from an input terminal 52. For reproducing various patterns of moiré, e.g., plywood-like moiré, and also reproducing moiré depending on various screen generating conditions, the threshold matrixes 24 whose resolution is higher than the resolution of the threshold matrixes 14 shown in FIG. 2 are selected in order to increase the resolution of bit map data b' j. Since the screen ruling and screen angles of the threshold matrixes 24 are necessarily the same as those of the printing conditions for reproducing moiré, etc., the screen ruling of the threshold matrixes 24 is 175, and the screen angles of the of the threshold matrixes 24 for the plates C, M, K have angle differences of 75°, 45°, 15°, respectively, with respect to a reference (0°) which is provided by the plate Y, as described above.

In order to increase the resolution, the threshold matrixes 24 for generating halftone dots have elements 256×256= 65536. The threshold in each of the elements may take either one of values of 1, 2, 3, . . . , 255, for example. The threshold matrixes 24 and the halftone-dot area percentage data aj are compared with each other, thus generating bit map data b' j in a step S10.

The bit map data b' j for the plates C, M, Y, K have a resolution of 44800 (256×175) DPI. The resolution is required to be of 2000 DPI or higher. Here, the resolution of 44800 DPI will be described as a preferred example suitable for various conditions as described above.

Then, the bit map data b' j of 44800 DPI are converted into data of 1600 DPI. For converting the bit map data b' j of 44800 DPI, a counting process is carried out in a step S12 by counting 28×28 (=784) dots of the bit map data b' j and converting them into one dot of count data p.

Figure 4A:
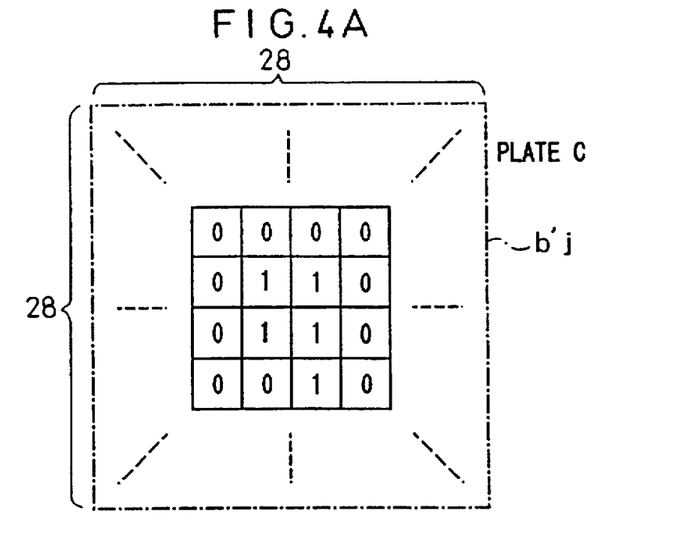
FIGS. 4A and 4B are diagrams illustrative of the generation of average colorimetric data from relatively high-resolution bit map data for producing a printed color document, in the process shown in FIG. 1.
Figure 4B:
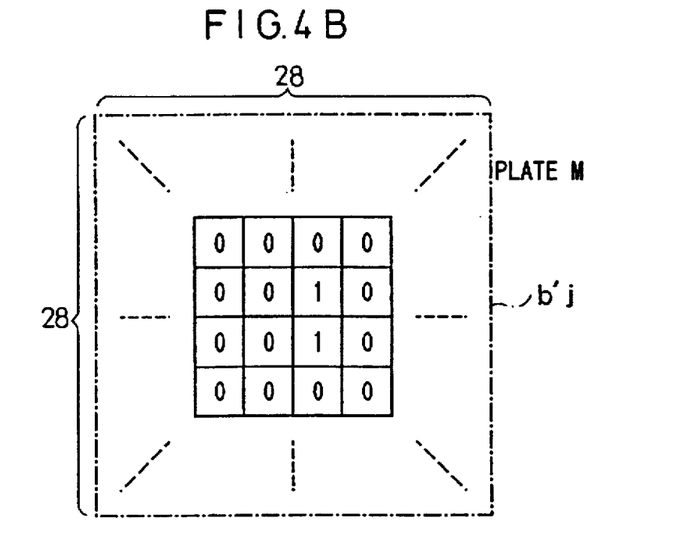

For illustrating the counting process in the step S12, 28×28 dots of the bit map data b' j for the plate C are shown in FIG. 4A, and 28×28 dots of the bit map data b' j for the plate M are shown in FIG. 4B. It is assumed that all non-illustrated elements in FIGS. 4A and 4B have a value of "0" and all elements of the remaining bit map data b' j for the plates Y, K also have a value of "0".

With respect to the 28×28 dots, the bit map data b' j for the four plates C, M, Y, K (in this example, the bit map data b' j for the two plates C, M) are simultaneously referred to, and area percentages ci for the respective colors, i.e., the $2^4=16$ colors because there are four plates, are counted.

For the pixels (corresponding to 28×28 dots) shown in FIGS. 4A and 4B, the area percentages ci for the respective colors are calculated as follows:

Color C; $ci=c_c=3/784$ (The area percentage $c_c$ represents an area where only the color C is present when the colors C, M are superposed and viewed in a transmissive manner, and an area where the colors C, M are superposed is represented by the area percentage $c_{C+M}$ of the color C+M=B.)

Color C+M; $c_{C+M}=2/784$

Color W; $c_W=779/784$ (This area percentage represents an area where neither the color C nor the color M is present when the colors C, M are superposed and viewed in a transmissive manner.)

The area percentage ci of remaining colors (13 colors such as the colors Y, K, etc.) is nil. When the area percentage ci per each group of 28×28 dots is thus generated, the count data p (each element value is represented by the area percentage ci) of 1600 DPI are generated.

Then, the colorimetric data Xi, Yi, Zi (i represents $2^4=16$ colors for the four plates C, M, Y, K) of each of the 16 colors printed by the printed color document 12, which have been measured by the colorimeter in the step S3, are processed into colorimetric data q (tristimulus value data X, Y, Z) using the area percentages ci for the respective colors counted in the step S12 as a weighting coefficient, according to the equation (4) given below in a step S13. Stated otherwise, the weighted mean of the colorimetric data Xi, Yi, Zi is calculated with the area percentages ci for the respective colors, thus determining tristimulus value data X, Y, Z (colorimetric data q).

$$X = \Sigma ci \cdot Xi \qquad (4)$$
$$= (3/784)X_C + (2/784)X_{C+M} + (779/784)X_W$$
$$Y = \Sigma ci \cdot Yi$$
$$= (3/784)Y_C + (2/784)Y_{C+M} + (779/784)Y_W$$
$$Z = \Sigma ci \cdot Zi$$
$$= (3/784)Z_C + (2/784)Z_{C+M} + (779/784)Z_W$$

When the counting process in the step S12 and the weighted-mean determining process in the step S13 for each group of 784 (28×28) dots are carried out in the full range of the bit map data b' j of 44800 DPI, the colorimetric data q of 1600 DPI are obtained.

Figure 5:
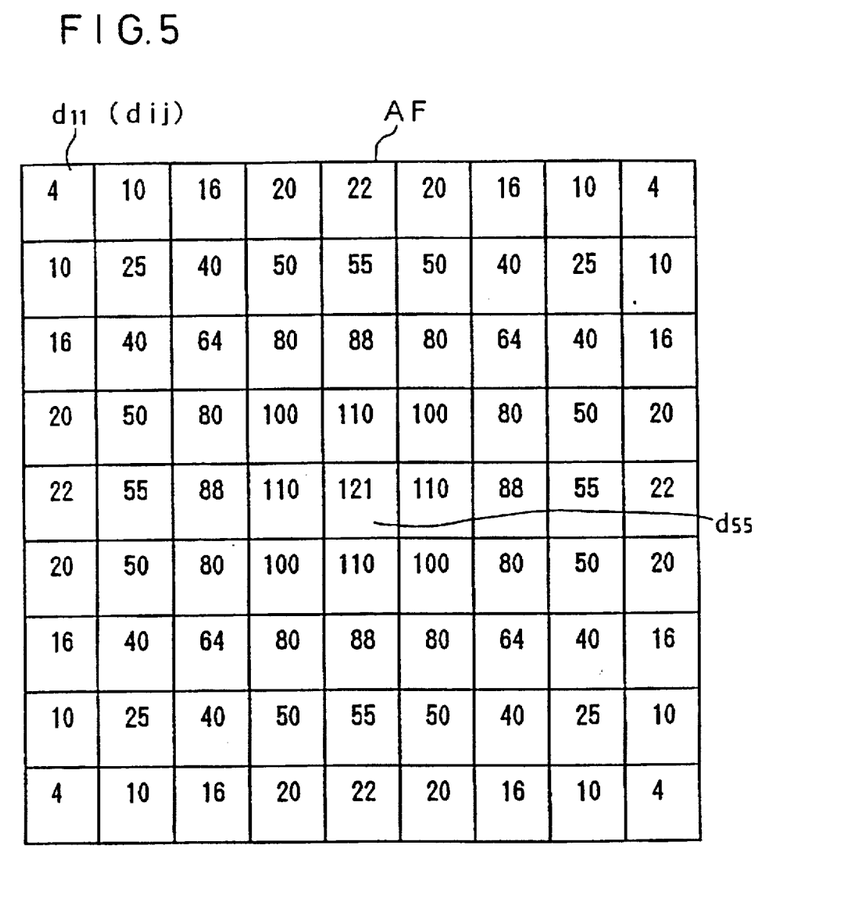
FIG. 5 is a diagram showing the matrix structure of an anti-aliasing filter.

Then, the obtained colorimetric data q of 1600 DPI are processed by an anti-aliasing filter AF shown in FIG. 5 into colorimetric data (second colorimetric data) β (tristimulus value data X, Y, Z) of 400 DPI which is equal to the resolution of the DP 3 in a step S14.

The anti-aliasing filtering process in the step S14 is inserted to avoid, in advance, aliasing noise which would be introduced due to the resolution of the DP 3 when the color proof CPb is to be generated with the resolution (400 DPI in this embodiment) of the DP 3. For effectively carrying out the anti-aliasing filtering process, it is necessary that the resolution of the image data (the colorimetric data q) which is an original signal to be processed by the anti-aliasing filter AF be higher than the resolution (400 DPI) of the DP 3. In this embodiment, the resolution of the image data (the colorimetric data q) to be processed by the anti-aliasing filter AF is set to 1600 DPI.

The structure of a matrix (a square matrix of n×n elements) of the anti-aliasing filter AF shown in FIG. 5 will be analyzed below.

Generally, for converting the colorimetric data q which are image data having a resolution of 1600 DPI into the colorimetric data β which are image data having a resolution of 400 DPI, since one dot of 400 DPI corresponds to 16 dots of 1600 DPI, the minimum number of elements of a filter with no anti-aliasing capability is 4×4.

To minimize aliasing noise, the number of elements of the anti-aliasing filter AF should preferably be as large as possible, but is limited by the operating speed, hardware, etc. thereof.

As can be analogized from the fact that color information can be reproduced by the Neugebauer's equation, the anti-aliasing filter AF is required to have such frequency characteristics that it will produce as small an insertion loss as possible in the vicinity of DC components because it is necessary for the anti-aliasing filter AF to pass components of relative low frequencies including DC components. Therefore, the response of the anti-aliasing filter AF at the center of the matrix should ideally be 0 dB.

An interference fringe component such as of moiré, i.e., a component which is equal to or less than the screen frequency (screen ruling) component, should remain unremoved in its entirety after the anti-aliasing filtering process in the step S14.

The anti-aliasing filter AF should be designed also in view of the fact that if the attenuation curve of the anti-aliasing filter AF is sharp, then a new false pattern will appear due to the anti-aliasing filtering process.

The structure of the anti-aliasing filter AF shown in FIG. 5 is composed of 9×9 elements designed in view of the above considerations. If the elements are represented by "dij", then the sum of the values (also called filter coefficients) of the respective elements dij need to be 1.0. Therefore, the actual value of each of the elements dij is divided by the sum (Σdij) of elements dij.

The filter coefficients of the anti-aliasing filter AF thus constructed are arranged such that, as shown in FIG. 5, its frequency characteristics provide a bell-shaped attenuation pattern which is monotonously reduced from the center toward the outer edges.

Figure 6:
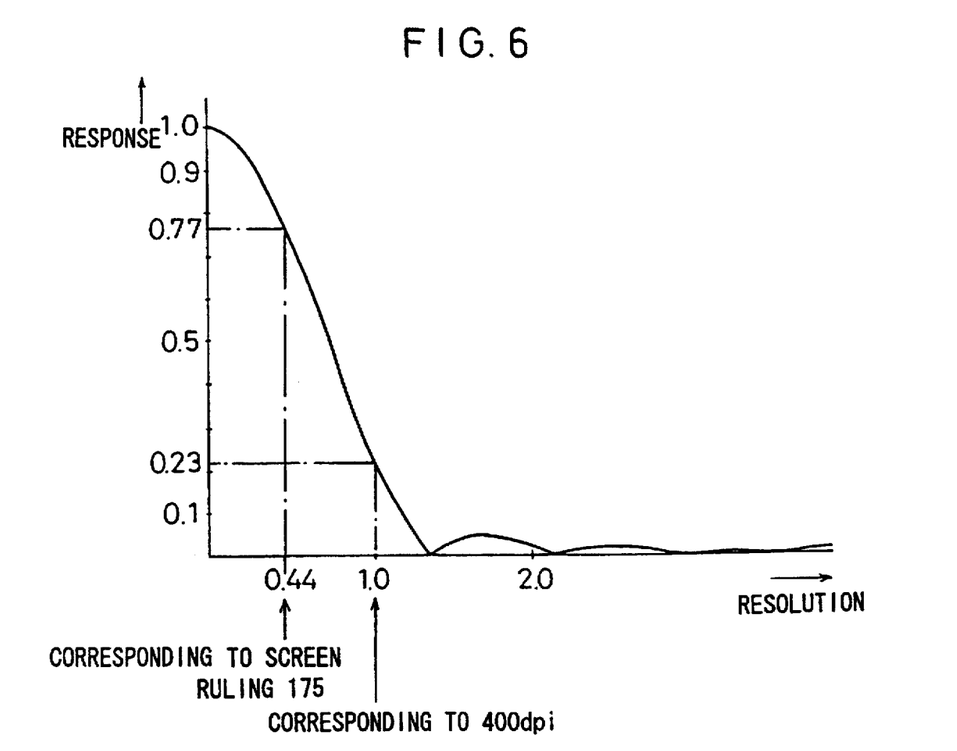
FIG. 6 is a diagram showing the frequency response of the anti-aliasing filter.

FIG. 6 shows the frequency characteristics of the anti-aliasing filter AF. In FIG. 6, the horizontal axis represents the resolution of the anti-aliasing filter AF with a value of 1.0 standardized by the resolution Ra=400 DPI of the DP 3. The screen ruling of 175 which is the screen frequency is standardized at a value of 0.44. The vertical axis in FIG. 6 represents the response of the anti-aliasing filter AF with a central element $d_{55}=121$ being standardized at a value of 1.0

It can be seen from FIG. 6 that the anti-aliasing filter AF shown in FIG. 5 has a response of about 0.23 at the resolution of 1.0, and a response of about 0.77 at the resolution of 0.44.

As a result of an analysis of various examples, it has been understood that if the response is 0.5 (50%) or more when the resolution is equal to the screen frequency (corresponding to the screen ruling) and if the response is 0.3 (30%) or less when the resolution is equal to the resolution of 1.0 of the color digital printer (DP) 3, then interference fringes such as moiré appearing on the printed color document 12 can be reproduced on the color proof CPb, and any aliasing noise can be made small enough not to be visually recognized.

The structure of the matrix (the square matrix of n×n (9×9) elements) of the anti-aliasing filter AF has been described above.

Figure 7A:
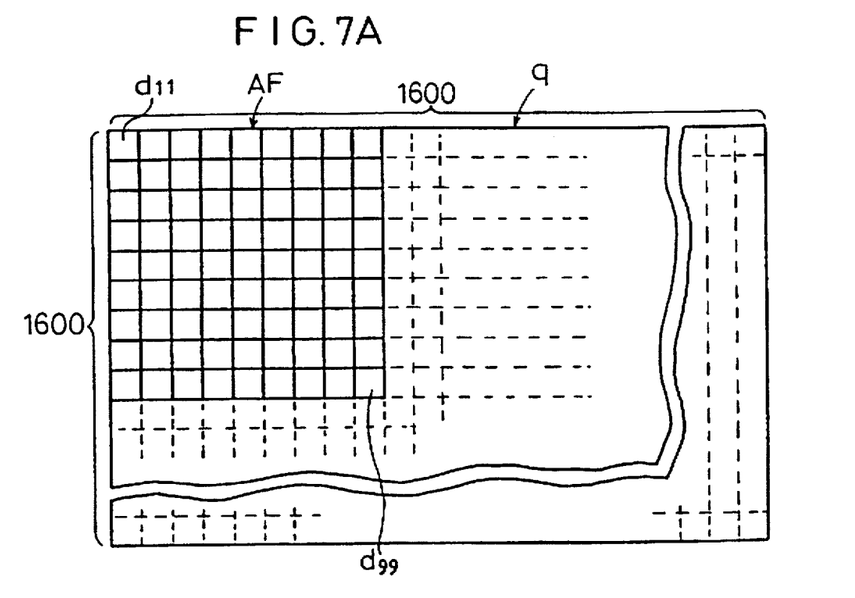
FIGS. 7A and 7B are diagrams illustrating the manner in which the colorimetric data are processed by the anti-aliasing filter.

FIGS. 7A and 7B are illustrative of the manner in which the colorimetric data are processed by the anti-aliasing filter AF. As shown in FIG. 7A, 9×9 dots in an upper left portion of the colorimetric data q of 1600 DPI are associated with the anti-aliasing filter AF of the 9×9 matrix whose elements are represented by dij as shown in FIG. 5, and the corresponding elements are multiplied, after which the sum of the products is determined. In this manner, the anti-aliasing filtering process is carried out. More specifically, if each of the elements of the colorimetric data q is represented by eij, then Σ(dij×eij) (for the 9×9 elements) is calculated, and used as colorimetric data β having a resolution of 400 DPI. While the sum of the anti-aliasing filter AF is standardized at Σdij=1 as described above, since multiplications involving decimal fractions are time-consuming, the values shown in FIG. 5 may be used as the values of the elements of the anti-aliasing filter AF, which are then represented by d'ij, and Σ(d'ij×eij)/Σd'ij may be determined as a value produced as a result of the anti-aliasing filtering process.

Figure 7B:
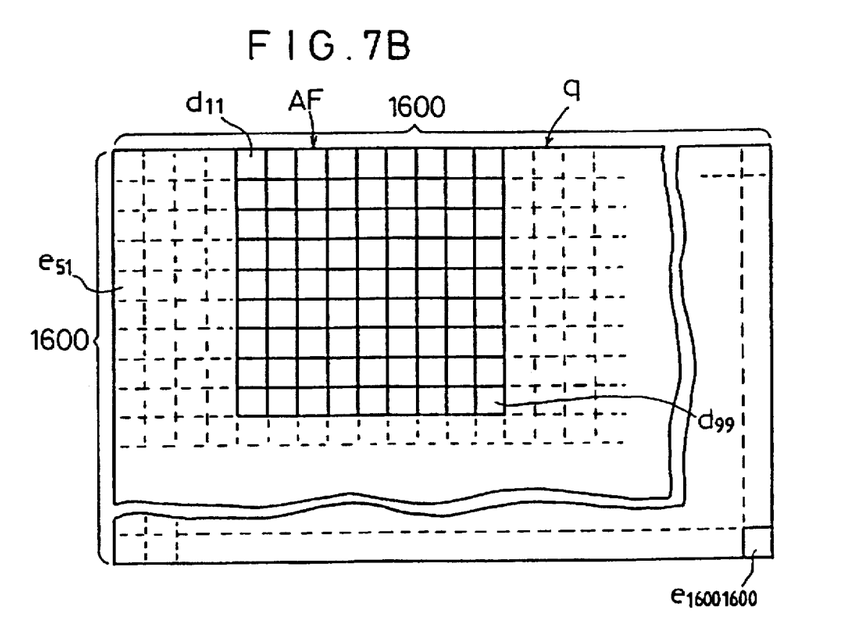

Because the anti-aliasing filtering process converts colorimetric data q having a resolution of 1600 DPI into colorimetric data β having a resolution of 400 DPI, the second anti-aliasing filtering process on the colorimetric data q may be carried out by shifting the anti-aliasing filter AF by 4 dots of the colorimetric data q to the right, for example, as shown in FIG. 7B. Similarly, the anti-aliasing filtering process is successively effected by shifting the anti-aliasing filter AF by 4 dots. After the anti-aliasing filtering process is carried out in a position equal to the right-hand end of the colorimetric data q, a fifth element $e_{51}$ from above shown in FIG. 7B is associated with an element $d_{11}$ of the anti-aliasing filter AF, and then the anti-aliasing filtering process is successively effected by shifting the anti-aliasing filter AF by 4 dots until an element $e_{1600\,1600}$ is associated with an element $d_{99}$. In this fashion, the colorimetric data q of 1600 DPI can be converted into the colorimetric data β of 400 DPI with its resolution reduced from the resolution of the colorimetric data q. The anti-aliasing filtering process may be defined as a filtering process for cutting off a spatial frequency response inherent in the DP 3 while maintaining a spatial frequency response inherent in the printing screen for the color printed material 12.

Then, color shift corrective data (first color shift corrective data) γ for correcting a color shift caused by the image structure simulation process in the step S8 (image structure simulating means) are generated from the colorimetric data (second colorimetric data) β generated in the step S8 and the colorimetric data (first colorimetric data) αgenerated in the step S21, in a step S25 (see FIG. 3). The color shift corrective data γ which appear at an output terminal 53 shown in FIG. 3 can be obtained by a simple mathematical calculation as a colorimetric data difference β−α(=γ) or a colorimetric data ratio α/β(=γ).

When the color shift corrective data γ thus generated are supplied from an input terminal 54 shown in FIG. 1, the color shift correcting LUT 21 can be generated.

The generation of the color shift correcting LUT 21 for correcting a color shift caused by the image structure simulation process in the step S8 has been described above.

Figure 8:
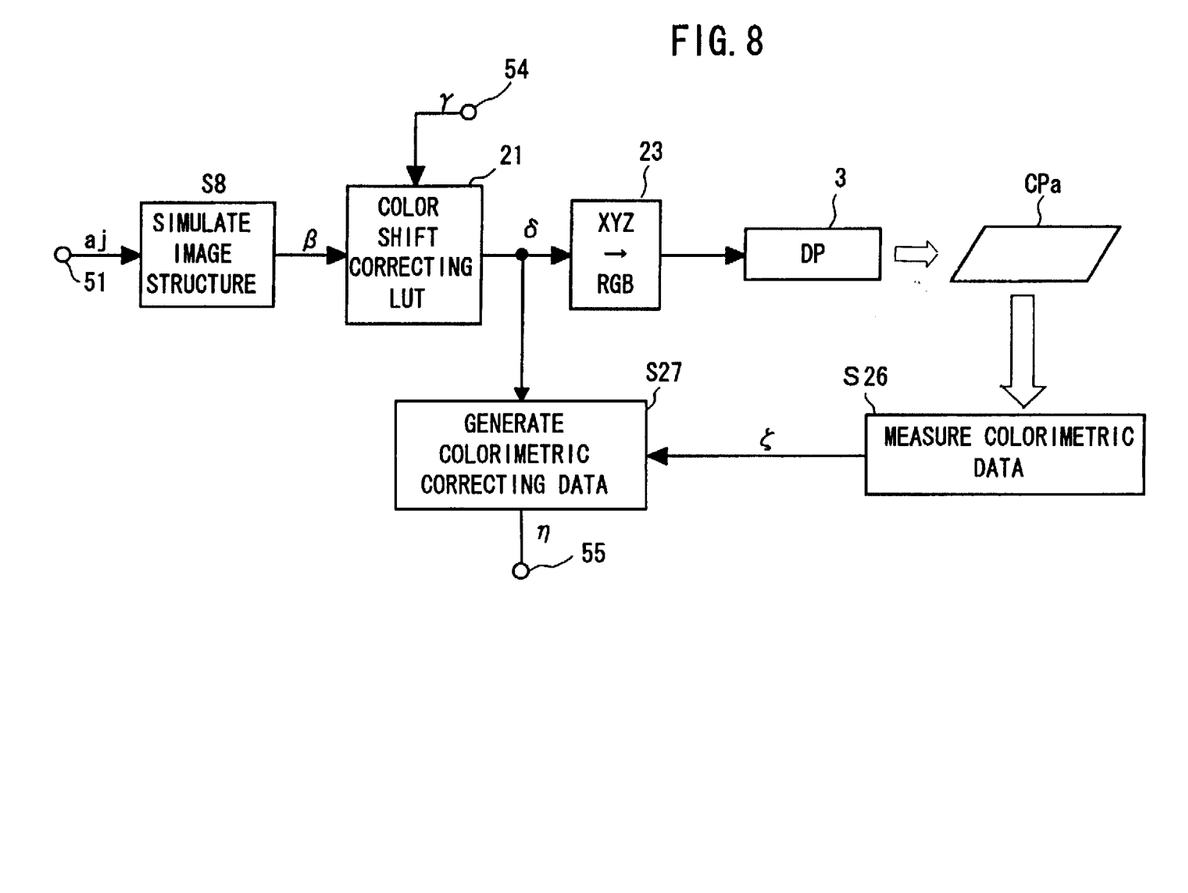
FIG. 8 is a block diagram illustrative of the generation of color shift corrective data upon use of a color printer.

FIG. 8 is illustrative of the generation of the color shift correcting LUT (color shift correcting means) 22 for correcting a color shift that is produced when the DP 3 which has a smaller color reproduction range than the color reproduction range of the color printed document 12 is used.

The halftone-dot area percentage data aj supplied to an input terminal 51 are converted into colorimetric data β by the image structure simulation process in the step S8, and corrected colorimetric data (first corrected colorimetric data) δ {for example, δ=β−γ=β−(β−α)=α, or δ=β×γ=β×(α/β)=α} are produced by correcting a color shift caused by the image structure simulation process with the color shift correcting LUT 21.

Since the corrected colorimetric data δ are common color space data, which may for example be tristimulus data X, Y, Z, they are converted into color space data inherent in the DP 3, i.e., RGB data in this case, with the LUT 23. Based on the RGB data thus produced, a preliminary print proof CPa is generated as a hard copy by the DP 3.

Then, the preliminary print proof CPa is measured by a colorimeter, producing colorimetric data ζ in a step S26. Color shift corrective data (second color shift corrective data) η for correcting a color shift caused by the use of the DP 3 are generated from the colorimetric data ζ and the corrected colorimetric data (first corrected colorimetric data) δ in a step S27. The color shift corrective data η which appear at an output terminal 55 can also be obtained by a simple mathematical calculation as a colorimetric data difference δ−ζ(=η) or a colorimetric data ratio ζ/δ(=η) as with the color shift corrective data γ.

When the color shift corrective data η thus generated are supplied from an input terminal 56 shown in FIG. 1, the color shift correcting LUT 22 can be generated.

For generating the printed color document CPb subsequently to the above preparatory procedure, a color shift caused by the image structure simulation process in the step S8 is corrected by the color shift correcting LUT 21, thus producing colorimetric data δ, and then a color shift caused by the use of the DP 3 is corrected by the color shift correcting LUT 22, thus producing colorimetric data (second corrected colorimetric data) θ. The corrected colorimetric data θ are then converted into RGB data by the LUT 23. An image on a hard copy that is generated by the DP 3 based on the RGB data, i.e., a color proof CPb, has its colors in conformity with those of the printed color document 12, and the image structure of a halftone dot image can be reproduced on the color proof CPb. The color proof CPb thus reproduces thereon interference fringes such as moiré, a rosette image, or the like which are substantially the same as those which appear on the printed color document 12, i.e., an image structure.

Though the resolution of the DP 3 has a relatively low value of 400 DPI, it is possible to reproduce, on the printed color document 12, substantially the same interference fringes such as moiré, a rosette image, or the like as those which appear on the printed color document 12 produced by a color printing machine having a resolution of 2000 DPI (which is assumed to be 1600 DPI in this embodiment). The colors of the printed color document 12 can accurately be reproduced on the color proof CPb by the color reproduction predicting process and the color shift correcting process. The color proof CPb can thus easily and inexpensively be generated.

Because of the anti-aliasing filtering process, it is possible to remove aliasing noise (also called a false pattern due to a beat on the image) produced owing to the resolution of the DP 3, i.e., a false image structure based on the interference between the screen period due to the DP 3 and the resolution of the printer (the resolution of the DP 3).

Figure 9:
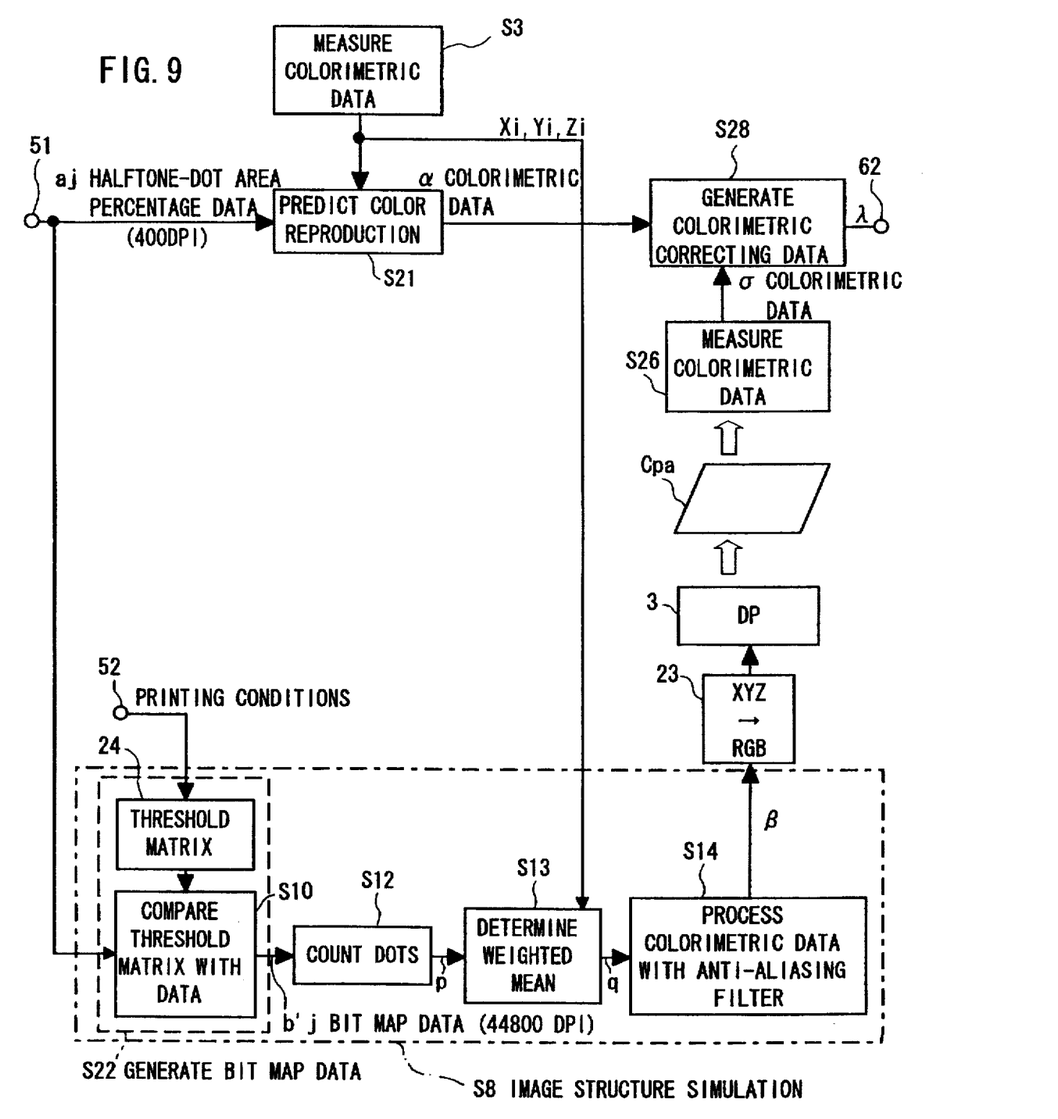
FIG. 9 is a flowchart of a processing sequence according to another embodiment of the present invention.

FIG. 9 shows a processing sequence according to another embodiment of the present invention. Those parts or steps shown in FIG. 9 which are identical to those shown in FIGS. 1, 3, 8, and 10 are denoted by identical reference characters, and will not be described in detail below.

The processing sequence shown in FIG. 9 represents an apparatus for (a process of) generating color shift corrective data λ to be set in a new color shift correcting LUT which comprises a combination of the color shift correcting LUT 2 for correcting a color shift produced by the image structure simulation process in the step S8 and the color shift correcting LUT 22 for correcting a color shift which is produced by using the DP 3.

Specifically, the colorimetric data (second colorimetric data) β outputted from the anti-aliasing filtering process in the step S14 are converted into RGB data by the LUT 23, and a preliminary color proof (preliminary print proof) CPa is generated based on the RGB data by the DP 3. The preliminary color proof CPa is measured by a colorimeter, thus producing colorimetric data (third colorimetric data) σ (third processing means).

The colorimetric data σ and the colorimetric data (first colorimetric data) α produced by the color reproduction predicting process in the step S21 are supplied as input data to a colorimetric corrective data generating process in a step S28, which then generates color shift corrective data (colorimetric corrective data) λ (λ=α−σ or λ=α/σ) (fourth processing means). The color shift corrective data λ are set in the new color shift correcting LUT through an output terminal 62. When the processing sequence shown in FIG. 9 is used, it is possible to correct the second colorimetric data β simultaneously with respect to a color shift caused due to the image structure simulation process and a color shift produced by the DP 3, with the single new color shift correcting LUT. A color proof CPb can then be generated based on the corrected colorimetric data θ by the DP 3 (fifth processing means).

While the DP 3 is employed as an image output device in the above embodiments, the DP 3 may be replaced with a color display monitor having a bit map memory and a bit map display.

According to the present invention, as described above, a color shift produced by a filtering process which cuts off a spatial frequency response inherent in an image output device such as a color printer, a color display monitor, or the like while retaining a spatial frequency response inherent in a printing screen of a printed color document during an image structure simulation process is corrected, and thereafter a color shift caused when the image output device is used is corrected.

Therefore, the colors and image structure of a printed color document can easily and accurately be reproduced based on a color proof, which may be either a hard proof or a soft proof, with an image output device that is relatively inexpensive and has a relatively low resolution.

Although certain preferred embodiments of the present invention have been shown and described in detail, it should be understood that various changes and modifications may be made therein without departing from the scope of the appended claims.

What is claimed is:

1. A method of generating a proof by converting halftone-dot area percentage data of three primaries for at least three plates into bit map data, and generating a proof for a printed color document based on the bit map data with an image output device, comprising the steps of:

effecting an image structure simulation process including a filtering process for cutting off a spatial frequency response inherent in the image output device while retaining a spatial frequency response inherent in a printing screen of the printed color document;

correcting a color shift produced when the image structure simulation process is effected; and thereafter, correcting a color shift produced when the printed color document is used.

2. An apparatus for generating a proof by converting halftone-dot area percentage data of three primaries for at least three plates into bit map data, and generating a proof for a printed color document based on the bit map data with an image output device, comprising:

means for effecting an image structure simulation process including a filtering process for cutting off a spatial frequency response inherent in the image output device while retaining a spatial frequency response inherent in a printing screen of the printed color document;

means for correcting a color shift produced when the image structure simulation process is effected; and means for subsequently correcting a color shift produced when the printed color document is used.

3. An apparatus according to claim 2, wherein said image output device comprises a color printer, and said proof comprises a hard copy outputted by said color printer.

4. An apparatus according to claim 2, wherein said image output device comprises a color display monitor, and said proof comprises an image displayed by said color display monitor.

5. An apparatus according to claim 2, wherein said image structure simulation process comprises the steps of:

referring to threshold matrixes having a higher resolution than the resolution of the printed color document with respect to the respective halftone-dot area percentage data of three primaries for at least three plates to convert the halftone-dot area percentage data of three primaries for at least three plates into respective bit map data;

simultaneously referring to the bit map data for the at least three plates to count an area percentage of each of colors ($2^n$ colors if the number of plates is n) with respect to each given range of the bit map data;

calculating first colorimetric data from predetermined colorimetric data of each of the colors using said counted area percentage as a weighting coefficient; and effecting an anti-aliasing filter process successively on said first colorimetric data in a range greater than pixels of the image output device for thereby converting the first colorimetric data into colorimetric data corresponding to the pixels of the image output device.

6. An apparatus for generating a proof by converting halftone-dot area percentage data of three primaries for at least three plates into bit map data, and generating a proof for a printed color document based on the bit map data with an image output device, comprising:

first processing means for producing first colorimetric data based on the halftone-dot area percentage data according to a color reproduction predicting process for the printed color document;

second processing means for producing second colorimetric data based on the halftone-dot area percentage data according to an image structure simulation process including a filtering process for cutting off a spatial frequency response inherent in the image output device while retaining a spatial frequency response inherent in a printing screen of the printed color document;

third processing means for generating a preliminary proof CPa based on said second colorimetric data with the image output device and producing third colorimetric data from said preliminary proof with a colorimeter;

fourth processing means for calculating said first colorimetric data and said third colorimetric data ($\sigma$) into corrective data; and fifth processing means for correcting said second colorimetric data based on said corrective data to generate a print proof with the image output device.

7. An apparatus according to claim 6, wherein said image output device comprises a color printer, and said proof comprises a hard copy outputted by said color printer.

8. An apparatus according to claim 6, wherein said image output device comprises a color display monitor, and said proof comprises an image displayed by said color display monitor.

9. An apparatus according to claim 6, wherein said image structure simulation process comprises the steps of:

referring to threshold matrixes having a higher resolution than the resolution of the printed color document with respect to the respective halftone-dot area percentage data of three primaries for at least three plates to convert the halftone-dot area percentage data of three primaries for at least three plates into respective bit map data;

simultaneously referring to the bit map data for the at least three plates to count an area percentage of each of colors ($2^n$ colors if the number of plates is n) with respect to each given range of the bit map data;

calculating first colorimetric data from predetermined colorimetric data of each of the colors using said counted area percentage as a weighting coefficient; and effecting an anti-aliasing filter process successively on said first colorimetric data in a range greater than pixels of the image output device for thereby converting the first colorimetric data into colorimetric data corresponding to the pixels of the image output device.

10. An apparatus according to claim 6, wherein said image structure simulation process obtains colorimetric data for each of color samples on the printed color document when the color samples are measured by a colorimeter and varied a given value at the time the halftone-dot area percentage data of three primaries for at least three plates are varied by a given value, determining colorimetric data between the color samples when varied said given value according to interpolation, and establishing the colorimetric data measured by the colorimeter and the colorimetric data determined according to interpolation as a look-up table or a corrective function addressable by said halftone-dot area percentage data as input data.

11. An apparatus according to claim 6, wherein said image structure simulation process comprises a process using the Neugebauer's equation.

12. An apparatus for generating a proof by converting halftone-dot area percentage data of three primaries for at least three plates into bit map data, and generating a proof for a printed color document based on the bit map data with an image output device, comprising:

first-stage processing means for producing first colorimetric data based on the halftone-dot area percentage data according to a color reproduction predicting process for the printed color document, producing second colorimetric data based on the halftone-dot area percentage data according to an image structure simulation process including a filtering process for cutting off a spatial frequency response inherent in the image output device while retaining a spatial frequency response inherent in a printing screen of the printed color document, generating first color shift corrective data to correct a color shift due to said image structure simulation process, from said first colorimetric data and said second colorimetric data, and correcting said first colorimetric data with aid first color shift corrective data to produce first corrected colorimetric data;

second-stage processing means for generating a preliminary proof based on said first corrected colorimetric data with the image output device and obtaining colorimetric data with a colorimeter, and generating second color shift corrective data to correct a color shift due to a color reproduction range of the image output device, from the obtained colorimetric data and said first corrected colorimetric data; and third-stage processing means for correcting said first corrected colorimetric data with said second color shift corrective data to produce second corrected colorimetric data, and generating a proof with the image output device based on said second corrected colorimetric data.

13. An apparatus according to claim 12, wherein said image output device comprises a color printer, and said proof comprises a hard copy outputted by said color printer.

14. An apparatus according to claim 12, wherein said image output device comprises a color display monitor, and said proof comprises an image displayed by said color display monitor.

15. An apparatus according to claim 12, wherein said image structure simulation process comprises the steps of:

referring to threshold matrixes having a higher resolution than the resolution of the printed color document with respect to the respective halftone-dot area percentage data of three primaries for at least three plates to convert the halftone-dot area percentage data of three primaries for at least three plates into respective bit map data;

simultaneously referring to the bit map data for the at least three plates to count an area percentage of each of colors ($2^n$ colors if the number of plates is n) with respect to each given range of the bit map data;

calculating first colorimetric data from predetermined colorimetric data of each of the colors using said counted area percentage as a weighting coefficient; and effecting an anti-aliasing filter process successively on said first colorimetric data in a range greater than pixels of the image output device for thereby converting the first colorimetric data into colorimetric data corresponding to the pixels of the image output device.

16. An apparatus according to claim 12, wherein said first corrected colorimetric data and said second corrected colorimetric data are produced using respective look-up tables or respective corrective functions.

17. An apparatus according to claim 12, wherein said image structure simulation process obtains colorimetric data for each of color samples on the printed color document when the color samples are measured by a colorimeter and varied a given value at the time the halftone-dot area percentage data of three primaries for at least three plates are varied by a given value, determining colorimetric data between the color samples when varied said given value according to interpolation, and establishing the colorimetric data measured by the colorimeter and the colorimetric data determined according to interpolation as a look-up table or a corrective function addressable by said halftone-dot area percentage data as input data.

18. An apparatus according to claim 12, wherein said image structure simulation process comprises a process using the Neugebauer's equation.

* * * * *